(12) United States Patent
Lin

(10) Patent No.: US 10,106,448 B2
(45) Date of Patent: Oct. 23, 2018

(54) BIOSLUDGE REDUCTION METHOD

(71) Applicant: Chang-Ching Lin, Kaohsiung (TW)

(72) Inventor: Chang-Ching Lin, Kaohsiung (TW)

(*) Notice: Subject to any disclaimer, the term of this patent is extended or adjusted under 35 U.S.C. 154(b) by 100 days.

(21) Appl. No.: 15/201,893

(22) Filed: Jul. 5, 2016

(65) Prior Publication Data

US 2017/0008787 A1    Jan. 12, 2017

(30) Foreign Application Priority Data

Jul. 8, 2015   (TW) .............................. 104122182 A

(51) Int. Cl.
*C02F 1/78* (2006.01)
*C02F 11/06* (2006.01)
*C02F 1/34* (2006.01)
*C02F 11/12* (2006.01)

(52) U.S. Cl.
CPC ............... *C02F 11/06* (2013.01); *C02F 1/34* (2013.01); *C02F 1/78* (2013.01); *C02F 11/12* (2013.01); *C02F 2303/06* (2013.01)

(58) Field of Classification Search
CPC .... C02F 11/12; C02F 1/50; C02F 1/34; C02F 1/78; C02F 2303/06; C02F 2305/023; C02F 11/06; C10L 5/00; C10L 5/366; C10L 5/46; C10L 2200/0469; C10L 2290/547; C10L 2290/08; C10L 2290/28; C10L 2290/24; C10L 2290/06; C10L 2250/06; C10L 2290/00; C10L 1/32; Y02E 50/10; Y02E 50/30

See application file for complete search history.

(56) References Cited

U.S. PATENT DOCUMENTS

| 6,337,020 | B1* | 1/2002 | Thieblin | C02F 1/34 |
| | | | | 210/173 |
| 7,309,432 | B1* | 12/2007 | Fabiyi | C02F 3/006 |
| | | | | 210/604 |
| 2007/0289909 | A1* | 12/2007 | Matsumoto | C02F 3/1221 |
| | | | | 210/170.08 |

FOREIGN PATENT DOCUMENTS

CN         203602470 U    5/2014

* cited by examiner

*Primary Examiner* — Walter D. Griffin
*Assistant Examiner* — Cameron J Allen
(74) *Attorney, Agent, or Firm* — Husch Blackwell LLP

(57) ABSTRACT

A biosludge reduction method includes: fracturing a biosludge under oscillation of an aqueous solution to split zoogleal bacteria flocs contained in the biosludge so as to form a mixture containing the fractured biosludge and the aqueous solution; introducing an oxidizing agent gas into the mixture to bring the fractured biosludge in contact with the oxidizing agent gas; and reacting the mixture with the oxidizing agent gas so as to conduct lysis of the zoogleal bacteria.

5 Claims, 3 Drawing Sheets

BIOSLUDGE REDUCTION METHOD

CROSS-REFERENCE TO RELATED APPLICATION

This application claims priority of Taiwanese Invention Patent Application No. 104122182, filed on Jul. 8, 2015.

FIELD

The disclosure relates to a biosludge reduction method.

BACKGROUND

A biosludge is a semi-solid slurry producible from a wastewater treatment in a wastewater treatment plant. The biosludge mainly includes microorganisms, microorganism metabolites, and organic and inorganic materials present in wastewater.

Referring to FIG. 1, a conventional method of treating a biosludge includes: mixing a biosludge with a polymer flocculant to form biological flocs; separating water from the biological flocs to form the biological flocs into a sludge cake; baking the sludge cake to dry the sludge cake; and burying or incinerating the baked sludge cake.

Besides, reduction of the biosludge with an ozone treatment is also proposed. However, for decreasing the cost for disposal of the biosludge and for reducing environmental pollution and release of carbon dioxide resulted from incineration, there is room for improving the efficiency in biosludge reduction.

SUMMARY

Therefore, an object of the disclosure is to provide a biosludge reduction method that can make an improvement in reduction of the biosludge in the wastewater treatment.

The biosludge reduction method includes: fracturing a biosludge under oscillation of an aqueous solution to split zoogleal bacteria flocs contained in the biosludge so as to form a mixture containing the fractured biosludge and the aqueous solution; introducing an oxidizing agent gas into the mixture to bring the fractured biosludge in contact with the oxidizing agent gas; and reacting the mixture with the oxidizing agent gas so as to conduct lysis of the zoogleal bacteria.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
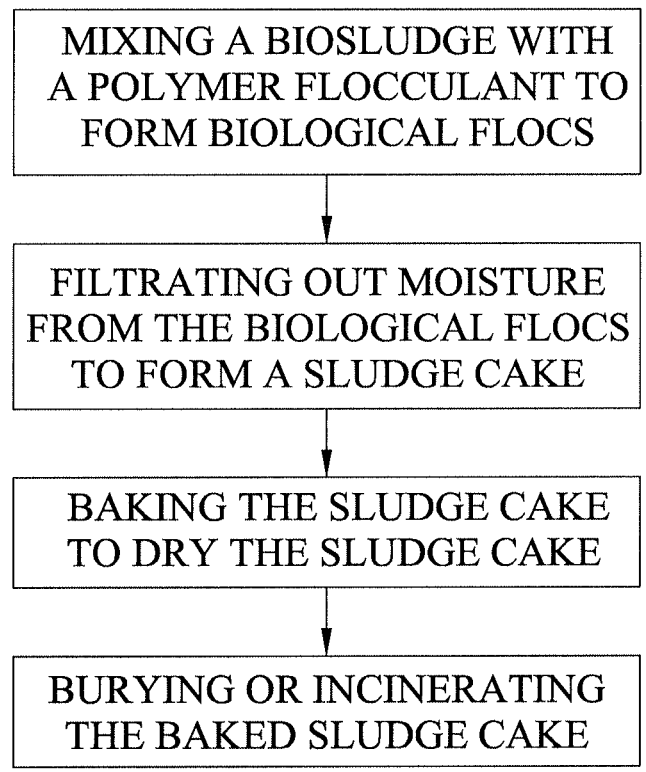
FIG. 1 is a flow chart illustrating a conventional method of treating a biosludge.
Figure 2:
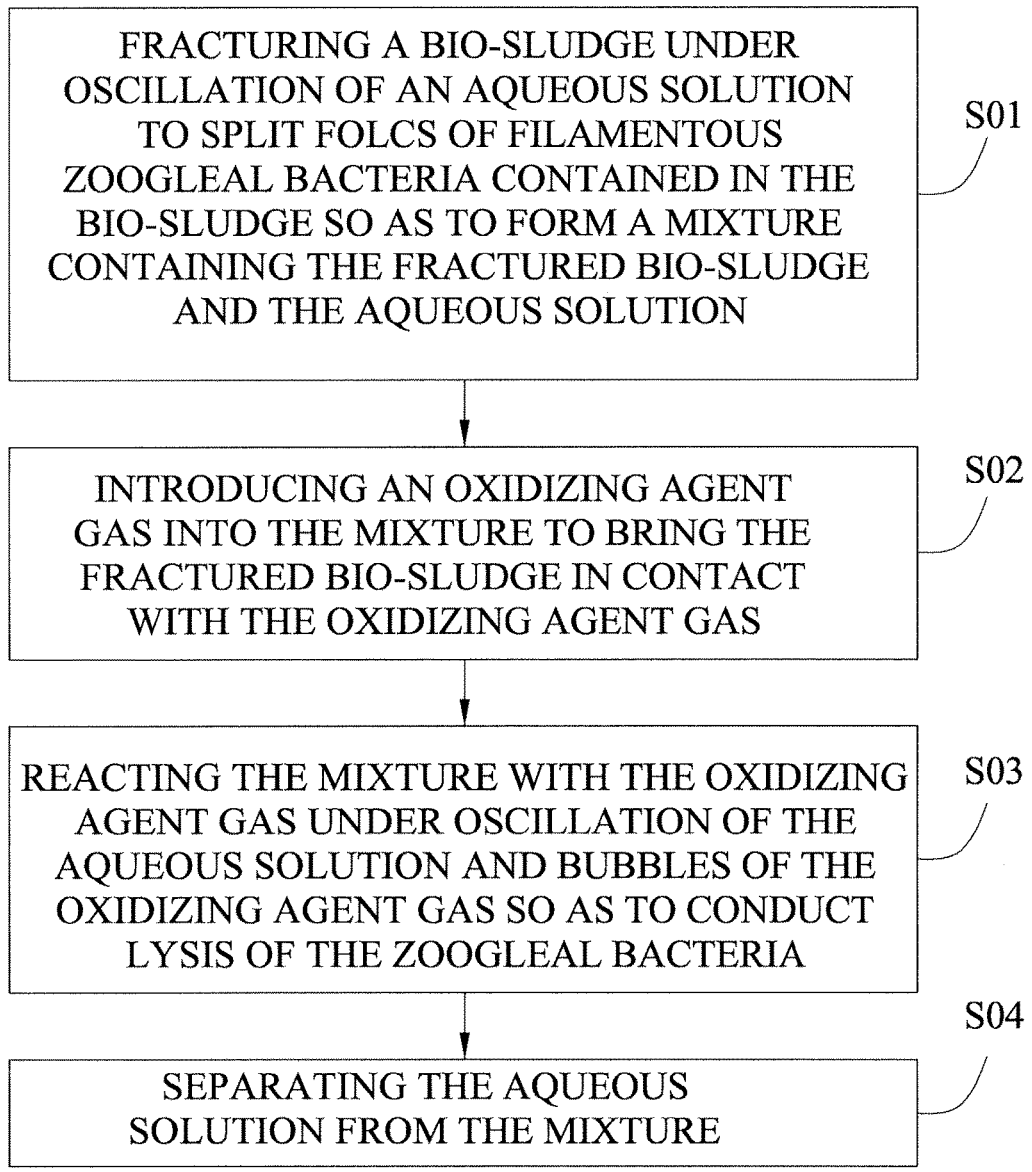
FIG. 2 is a flow chart illustrating the consecutive steps of an embodiment of a biosludge reduction method according to the disclosure.
Figure 3:
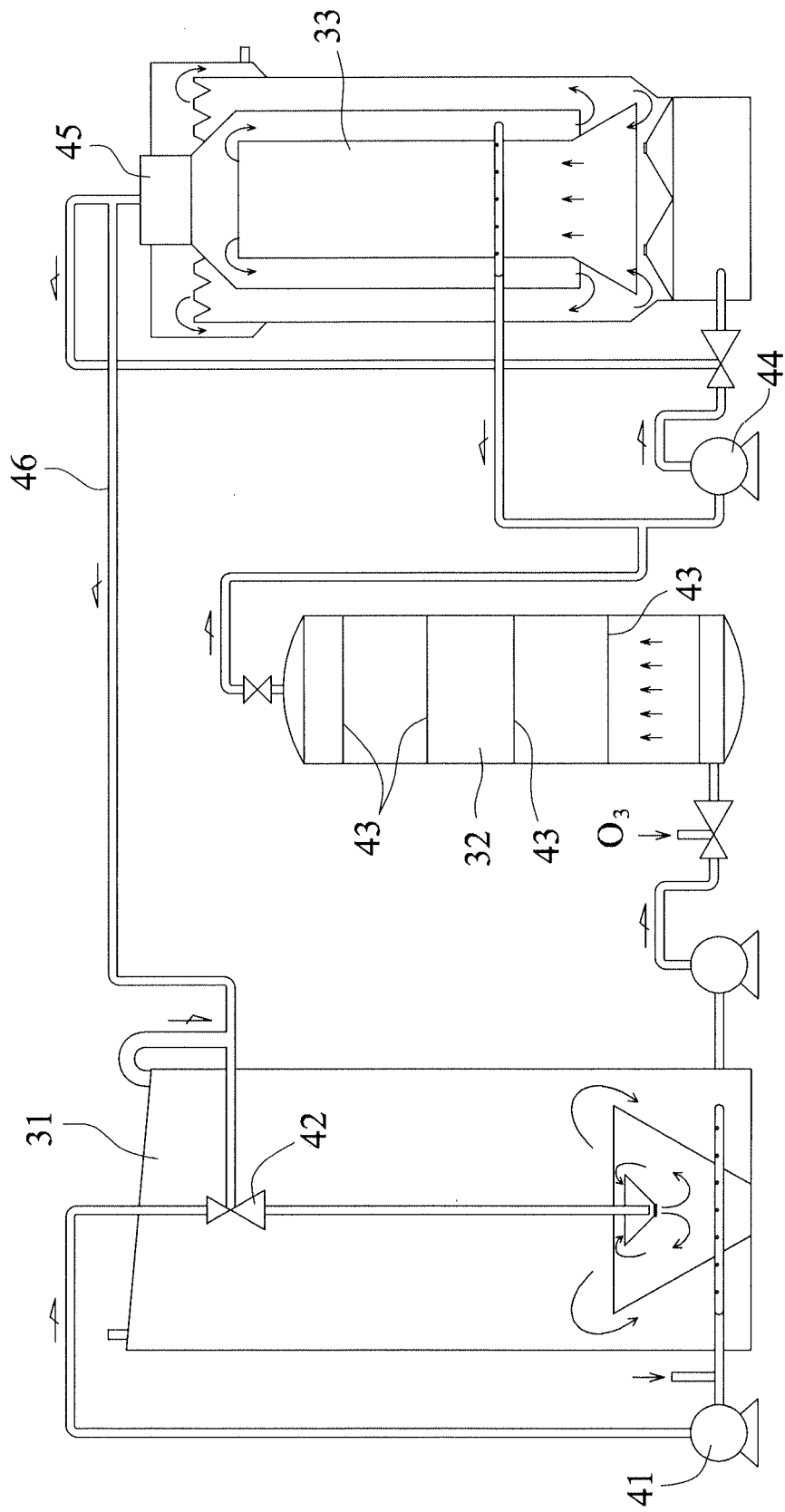
FIG. 3 is a schematic view illustrating an apparatus adapted to carry out the embodiment of FIG. 2.

Referring to FIGS. 2 and 3, an embodiment of a biosludge reduction method suitable to be applied to treat a biosludge produced from a wastewater treatment plant is disclosed.

The biosludge reduction method includes steps S01 to S04 as described as follows.

In step S01, a biosludge, which includes zoogleal bacteria flocs and is obtainable from the wastewater treatment plant, is delivered by a pump 41 and introduced into a first reaction chamber 31 by an injector 42 at a concentration ranging from 1% to 1.5% by weight. The biosludge is fractured under oscillation of an aqueous solution to split the zoogleal bacteria flocs so as to form a mixture containing the fractured biosludge and the aqueous solution. The aqueous solution is exemplified to be water in this embodiment. The fractured sludge has an increased surface area facilitating subsequent treatments.

In step S02, an oxidizing agent gas is introduced into the mixture and moved together with the mixture to a second reaction chamber 32. In this embodiment, the oxidizing agent gas is exemplified to be ozone, and the oxidizing agent gas is introduced in an amount of 0.06 grams to 0.13 grams per 1 gram of dry weight of the fractured biosludge. For enhancing sufficient contact between the fractured biosludge and the ozone, at least one perforated plate 43 may be disposed in the second reaction chamber 32 so as to evenly distribute the mixture to bring the fractured biosludge to be in sufficient contact with the ozone. In this embodiment, the second reaction chamber 32 is exemplified to be provided with three perforated plates 43.

In step S03, the mixture, the water and the ozone are subsequently moved to the third reaction chamber 33 by a pump 44 and then the mixture is reacted with the ozone under oscillation of the water and bubbles of the ozone so as to conduct lysis of the zoogleal bacteria. Cells of the zoogleal bacteria are lysed during the reaction of the mixture with the ozone. In one form, posterior to reacting of the mixture with the ozone, the unreacted ozone is separated by a separating device 45, and then recycled to the first reaction chamber 31 through a pipeline 46 to be pre-mixed with the biosludge. Therefore, the ozone can be efficiently utilized.

In step S04, posterior to reacting of the mixture with the ozone, the aqueous solution may be separated from the mixture to form the residual mixture into a sludge cake. The products of the lysis of the zoogleal bacteria may be removed from the mixture together with the aqueous solution. In this embodiment, the removal of the aqueous solution is performed using filter press techniques. It is noted that the filter press techniques are well known to those skilled in the art, further details thereof are not provided herein for the sake of brevity. Moreover, the sludge cake may be reused based on the composition thereof and uses. For instance, when the sludge cake includes organic materials, nitrogen, and phosphorus, the sludge cake can be reused as a fertilizer, or a biomass fuel after being subjected to further processes.

To sum up, by virtue of the biosludge reduction method of the disclosure, combining the step of fracturing the biosludge with the step of treating the biosludge with the oxidizing agent gas contributes to reducing the volume of the residual biosludge in an efficient manner.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A biosludge reduction method, comprising:
    fracturing a biosludge under oscillation of an aqueous solution to split zoogleal bacteria flocs contained in the biosludge so as to form a mixture containing the fractured biosludge and the aqueous solution;
    introducing an oxidizing agent gas into the mixture to bring the fractured biosludge in contact with the oxidizing agent gas; and
    reacting the mixture with the oxidizing agent gas under oscillation of the aqueous solution and bubbles of the oxidizing agent gas by injecting the mixture mixed with the oxidizing agent gas into a reaction chamber so as to conduct lysis of the zoogleal bacteria.

2. The biosludge reduction method of claim 1, wherein the aqueous solution is water and the oxidizing agent gas is ozone.

3. The biosludge reduction method of claim 1, further comprising posterior to reacting of the mixture with the oxidizing agent gas, separating the aqueous solution from the oxidized mixture.

4. The biosludge reduction method of claim 1, wherein in the biosludge has a concentration ranging from 1% to 1.5% by weight during fracturing of the biosludge.

5. The biosludge reduction method of claim 1, wherein the oxidizing agent gas is introduced in an amount of 0.06 to 0.13 grams per 1 gram of dry weight of the fractured biosludge.

* * * * *